(12) United States Patent
Hughes

(10) Patent No.: US 8,140,577 B2
(45) Date of Patent: Mar. 20, 2012

(54) PROCESSING XML NODE SETS

(75) Inventor: Merlin P. D. Hughes, New York, NY (US)

(73) Assignee: Cybertrust Ireland Limited, Dublin (IE)

( * ) Notice: Subject to any disclaimer, the term of this patent is extended or adjusted under 35 U.S.C. 154(b) by 0 days.

(21) Appl. No.: 13/173,953

(22) Filed: Jun. 30, 2011

(65) Prior Publication Data

US 2012/0005570 A1 Jan. 5, 2012

Related U.S. Application Data

(63) Continuation of application No. 10/651,107, filed on Aug. 29, 2003, now Pat. No. 8,001,156.

(51) Int. Cl.
*G06F 17/30* (2006.01)
(52) U.S. Cl. ...................................... 707/790
(58) Field of Classification Search .............. 707/3, 790, 707/754; 715/513; 709/226; 713/155
See application file for complete search history.

(56) References Cited

U.S. PATENT DOCUMENTS 7,107,282 B1 * 9/2006 Yalamanchi ................. 707/754
2008/0005660 A1 * 1/2008 Austel et al. ................. 715/513
* cited by examiner

*Primary Examiner* — Etienne Leroux

(57) ABSTRACT

A method may include deriving by a computing device, from an initial representation that describes a node set of an XML document, a derived representation of the node set, the initial representation including an ordered sequence of set manipulations of the XML document, the derived representation including: a first set of nodes such that all nodes in the node set are included in or descendants of a node in the first set of nodes, a second set of nodes such that no nodes in the node set are included in or descendants of a node in the second set of nodes, and a set of node tests that characterize the node set, to be applied to those nodes within the first set of nodes but outside the second set of nodes. The method may further include evaluating the derived representation to compute the node set.

22 Claims, 5 Drawing Sheets

Node set: { E, J, K, L, N, P, Q, T, W, X }
Document-order traversal: E, K, L, P, Q, J, N, T, W, X Document-order traversal: A, B, E, F, C, G, H, D, I, J.

Tree B: { B, E, F, K, L }
Tree H: { H, M, N }
Forest: { { B, E, F, K, L }, { H, M, N } }

$k_3 = h_2$
$k_2 < h_1 \Rightarrow K < H$

PROCESSING XML NODE SETS

CROSS REFERENCE TO RELATED APPLICATIONS

This application is a continuation of U.S. patent application Ser. No. 10/651,107, filed on Aug. 29, 2003, which is hereby incorporated by reference in its entirety.

FIELD OF THE INVENTION

This invention relates to a data processing method. It has particular application to processing of a document encoded in the extensible mark-up language (XML).

An XML document is a hierarchical tree of XML nodes. Each node has a type and, depending on the type, optionally a name, value, and other associated information. For example, the XML document depicted by FIG. 1 contains a root node (the document node), which has a child node (an element node; in this case, contract), which in turn has three child nodes (the element nodes Preface, Body and signature) which themselves may have further child nodes (represented as ellipses).

Often, XML documents are represented in a serialised form (for example, for storage in a file or for transmission). For the sake of clarity, in the remainder of this specification, XML documents will be represented as abstract trees of labelled nodes; the different representations are exactly equivalent, however the abstract tree form lends itself more readily to explication.

Many operations that are performed on an XML document require the creation of a node set, manipulation of the node set and subsequent processing of the node set in a required order (most typically, document order). A node set is a set of none, some or all of the nodes from an XML document. Document order is the order that the nodes would be encountered in an in-order traversal of the underlying XML document. Processing node sets in this manner (i.e., creating and manipulating node sets within an XML document and iterating over these node sets) is fundamental to XML canonicalization, digital signature generation and validation, and other cryptographic operations within the XML domain. When an XML signature, as set forth in "XML-Signature Syntax and Processing", is operating over a document subset (i.e., a portion of the XML document), that document subset is represented by a node set. Further, this node set may require manipulation; in order, for example, to remove certain nodes from consideration by the signature algorithm as, for example, with the enveloped signature transform or as set forth in "XML-Signature) (Path Filter 2.0". Finally, in order to actually perform the digital signature or message digest operation on the node set, it must be rendered from a node set into a sequence of bytes through application of a canonicalization algorithm which iterates over the nodes of the node set in document order; as, for example, set forth in "Canonical XML Version 1.0" and "Exclusive XML Canonicalization 1.0".

BACKGROUND OF THE INVENTION

There are a several well-known techniques for processing XML node sets and performing document-order iteration of their nodes.

A first technique is to store the nodes of the node set in an unordered set U. Then, an in-order traversal of the underlying XML document is performed, and each node of the document is tested for membership of U. If the node is present in U, then it is part of the node set and so it can be processed. This technique is straightforward. However, its execution speed is O(N), where N is the number of nodes in the underlying document (or a typically large subtree of the document). This makes the technique inefficient for small node sets in large documents.

A second known technique starts by storing the nodes of the node set in an unordered set U. This collection is then sorted using a standard sorting algorithm and a document-order comparison function. For example, the heapsort algorithm can sort n items in time $O(n*\log(n))$. Then, iterate over the resulting sequence S. If a constant-time comparison function is available (this is rare, and typically only efficient for static XML documents with specialised parsing tools), then execution time will be $O(M*/\log(M))$, where M is the number of nodes in the node set. More typically, the comparison function will be logarithmic in the size of the XML document, and so execution time will be $O(M*\log(M)*\log N))$.

In a third technique, the nodes of the node set are stored in an ordered set S, for example, a binary tree-based set of n items supports search and update in time $O(\log(n))$. The document order of the nodes is maintained from the outset, so iteration is simply a case of sequencing through S. Although this appears attractive, providing iteration performance of $O(M)$, it is not so effective in practice. In many instances, node sets are created by performing a sequence of manipulations on an initial node set that consists of the whole or a large part of an XML document. In such cases, processing time will be linear in the size of the initial, large node set. Furthermore, many of the manipulations cannot be performed efficiently on the ordered set, resulting in yet poorer performance.

Consider the XML document depicted in FIG. 2 below, and a node set consisting of just the emboldened nodes. A document-order traversal of the node set using a method that is linear in the size of the XML document will involve 24 node test computations (one for each node in the document), although the node set consists of only 10 nodes. A traversal using one of the sorting techniques may involve up to 150 tests ($10*\log(10)*\log(24)$).

SUMMARY OF THE INVENTION

An aim of this invention is to provide a method for representing, manipulating and enumerating, for example in document order, a node set in an XML document that is more efficient in terms of processor and memory requirement than known methods, advantageously having a processing time that is proportional to the size of the node set to be enumerated.

From a first aspect, this invention provides a method for enumerating a node set in an XML document comprising:

a. deriving a representation that describes a set of nodes that includes the node set; and b. enumerating the set of nodes specified by the representation.

The method does not enumerate the entire XML document, nor does it enumerate the nodes of the node set when deriving its representation. Rather, it characterizes the node set as a forest of trees containing all the nodes of the node set, a forest of trees containing none of the nodes of the node set, and a (maybe empty) set of additional node tests. By specification of the forests to match the node set as closely as possible, the number of nodes that need be tested during enumeration is minimised.

Conveniently, step a. may derive the representation from a universal resource indicator that describes the node set. For example, the URI may be a whole-document URI. In such a case, the URI dereferences to a set of nodes containing every node in the XML document with the exception of comment nodes. Alternatively, the URI may be a bare-name URI. In such cases, the URI dereferences to a set of nodes containing every node of a particular tree in the document with the exception of comment nodes, the tree being rooted at an element node that is identified by the label value from the URI. Alternatively, the URI may be an XPointer URL In such instances, the URI dereferences to a set of nodes containing every node from a forest of trees in the document, the trees being rooted by a set of nodes that is computed by evaluating the XPointer expression. In the latter such case, the XPointer expression may be analyzed to determine whether the root nodes that it identifies are in a required order (for example, document order). When such analysis is made, a sort operation is performed on the root nodes in the event that the analysis shows that the result of) (Pointer evaluation is not in the required order. In all cases, the node set is represented by a description that specifies the result of dereferencing the URI; (e.g., whether or not comments are included, what root nodes were identified, whether they were ordered, etc.).

In some methods embodying the invention, a transform may be applied to the node set by manipulation of the representation of the node set. For example, one of the applicable transforms may be a signature transform that removes a tree of nodes from the node set. In the case of an enveloped signature transform, the tree of nodes removed are rooted at a specific XML signature element. Alternatively, another applicable transform may be an) (Path filter transform which can be used to restrict the node set to certain parts of the XML document, and to remove from it other parts of the XML document. Again, this transform is effected through manipulation of the representation, not an enumerated node set.

From a second aspect, the invention provides a method for applying a digital signature to an XML document comprising:
  a. deriving a representation that describes a set of nodes within the document that is to be digitally signed;
  b. enumerating the nodes of the high-level node set representations in document order in order to apply a canonicalization algorithm to it;
  c. inserting the message digest or digital signature into the XML document.

This method employs the technique for representing, manipulating and enumerating a node set provided by the first aspect of the invention to the selections of node sets of the XML document to which a digital signature is to be applied. Prior to enumeration of the nodes, the representations may be manipulated according to any transforms that are specified in the XML signature.

In addition, the method may further include a step of applying a canonicalization algorithm to the enumerated nodes to create a sequence of bytes suitable for processing by a message digest or digital signature algorithm.

From a third aspect, this invention provides a software library that presents an application program interface (API) including procedures that permit an application program to perform a method embodying the first or the second aspect of the invention. Such an API may include one or more of;
  a. a definition procedure to define a representation that describes a node set in an XML document;
  b. a manipulation procedure to modify a representation that describes a node set in order to effect a transformation on the represented node set;
  c. an enumeration procedure to enumerate a node set in document order from its representation;
  d. a dereferencing procedure to dereference a URI and compute a representation of a set of nodes in an XML document identified by the UM;
  e. a signing procedure to generate an XML digital signature or digital signature reference;
  f. a validation procedure to validate an XML digital signature or digital signature reference;
  g. a canonicalization procedure to render a node set into its canonical form, as set forth in the various XML canonicalization specifications; and
  h. a procedure to enable analysis or processing of the nodes of a representation of a node set in document order.

From a fourth aspect, this invention may provide a plugin (for example, constructed using a software library embodying the third aspect of the invention) that enables a browser or other application environment to enumerate a node set within an XML document employing a method according to the first or the second aspect of the invention, and to generate and validate XML signatures by employing the node set representation, manipulation and enumeration methods according to the second aspect of the invention.

DESCRIPTION OF THE PREFERRED EMBODIMENTS

Figure 1:
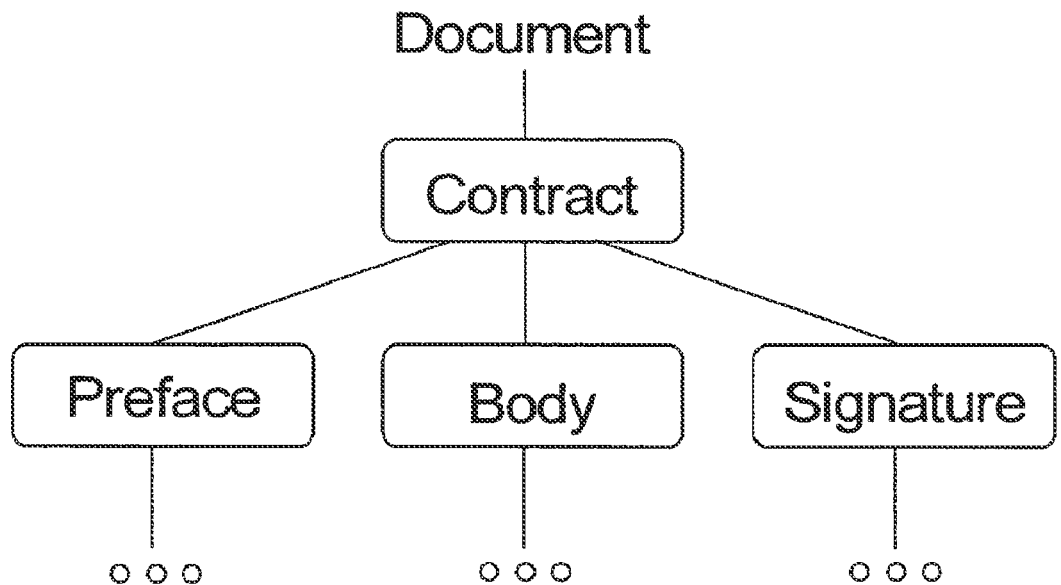
FIG. 1 shows the structure of a typical small XML document.

An embodiment of the invention will now be described in detail, by way of example, and with reference to the accompanying drawings.

The example relates to digital signing of XML documents, but processing of node sets by techniques disclosed in this specification has considerably broader application.

In order that the present invention can be clearly understood, several important concepts and terms relating to XML will first be reviewed,
Canonicalization In addition to signing complete XML documents, the XML signature specification allows applications to sign parts of XML documents.

Using XML pointer references it is possible to identify a particular XML subtree based on a matching ID attribute. This could be useful, for example, to sign a single XML fragment within a larger XML document. Alternatively, XML transforms can be used to select XML document fragments.

This raises certain security concerns, however, because the interpretation of a particular XML fragment may depend on contextual information. A particular fragment may have one meaning in one context and another meaning in a different context; for example, dollar has one meaning in the context of the United States and another in Australia.

For this reason, the XML signature specification defines a special type of processing, called canonicalization, which is automatically applied to XML fragments prior to signing. Canonicalization takes an XML fragment and converts it into a byte stream, before the message digest operation is applied.

Processing of an entity prior to signing it (i.e. before a message digest operation takes place) is termed a transform. The XML signature specification supports a variety of additional transforms, one of which is enveloped signature transforms. Canonicalization is itself a transform, automatically applied to XML document fragments (node sets) prior to digesting.

A particular type of transform is the Enveloped signature transform. This is best explained by way of example.

Consider the problem of trying to produce a self-contained signed document. The aim is to sign the document and then insert the signature within the document for easy transportation, just as a traditional letter is signed. However, during verification, the signature is a part of the document. So when the message digest is computed, it will be of a modified document, which means the signature verification process will fail.

A solution to this problem is the enveloped signature transform. This transform removes the signature structure from the document prior to digesting. Thus, the signing and verification operations will both be performed on a node set consisting of everything in the document but the XML signature.

XPath

XPath is a mechanism that is used to search, select, match and perform computations on parts of XML documents. It is the foundation for various higher-level mechanisms, such as XML stylesheets (XSLT), XML pointers (XPointer), amongst others. It is a very flexible technology, and can be used in a variety of ways.

An XPath expression is a textual description of a 'pattern matching' expression, and is written according to the XPath language. An XPath expression is evaluated against an XML node within an XML document, and can return a Boolean (true/false), a number, a string, or a set of XML nodes.

For example, the following XPath expressions all return true if they are evaluated against an XML element with the name Book and an Author attribute with the value 'Jane Doe':

self::Book and (attribute::Author='Jane Doe')
self::Book and (@Author='Jane Doe')
self::Book [@Author='Jane Doe']

Alternatively, the following XPath expressions return the number of Chapter elements within a Book; the first version verifies that it is executed on a Book element (returning 0 otherwise), the second does not:

count(self::Book/child::Chapter)
count(child::Chapter)

The following XPath expressions return the title of a Book; the same checks are done as in the number example, and some XPath shorthands are used:

string(self::Book/child::Header/child::Title)
string(Header/Title)

The following XPath expressions returns a set of all the Section elements within chapters of the book; the first two verify that they are evaluated against a Book element (will return no nodes otherwise); the third assumes that it is evaluated against a Book element (will work against any node that has Chapter/Section children); the fourth will return the book sections, no matter what node of the document it is evaluated against—the initial '/' means that it always searches from the root of the document:

self::Book/child::Chapter/child::Section
self::Book/Chapter/Section
Chapter/Section
/Book/Chapter/Section The following expression returns Section 2 of Chapter 4 of the book:

Chapter [4]/Section [2])

Finally, the following expression returns the (crude) concatenation of all section titles in the book:

concat(Chapter/Section/@Title)

XPointer

XPointer is a mechanism for addressing parts of an XML document, building on the XPath language. In the context of XML signatures, a basic XPath expression selects individual nodes from a document; XPointer expressions select subtrees of the document.

Consider, for example, the following XPath expression; this will select all the Chapter elements in a book, however it will not select any of their children; that is to say, it will not select the contents of the chapter elements:

/Book/Chapter

In order to select the contents of the chapters, a clumsy XPath expression that descends into each chapter and selects all nodes, attributes and namespaces is required:

(/Book/Chapter//.|/Book/Chapter//@*|/Book/Chapter//namespace::*)

An XPointer expression can express the same concept much more clearly; it is evaluated and automatically expanded to include the entire contents of the chapters:

xpointer(/Book/Chapter)

Where XPath is a general-purpose matching language, XPointer is a refinement that can be used to easily identify complete trees/sections of an XML document.

Document Order

Figure 3:
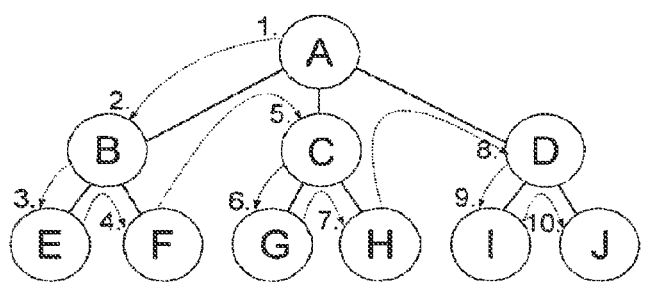
FIG. 3 illustrates document-order traversal of a small XML document.

Document order refers to the order obtained by performing a standard in-order (depth first) traversal of the nodes of an XML document. To be precise, attribute nodes and namespace nodes are not included in the document order traversal of an XML document. However, this distinction has no particular impact on the techniques provided by this invention, and these nodes are given no further special consideration; they can be treated as any other child nodes of the element node to which they belong. For example, FIG. 3 below depicts an abstract XML document and a document order traversal thereof.

When a node set is enumerated in document order, its nodes appear in the same order as they would in a document-order enumeration of the document from which the node set is derived. Thus, for a node set derived from the document of FIG. 2 that includes the nodes D, E and F, the enumeration of the node set in document order yields nodes in order E, F, D.

Explanation of Symbols

{ } A set $=, \neq, >, \geq$ Equals, not equals, greater, greater or equals $\&, \neg$ And, or, not $\cap, \cup, \setminus$ Intersection, union, subtraction $\in, \notin, \subset$ Element of, not an element of, subset of $\exists, \neg\exists$ There exists, there does not exist $\Sigma$ Summation

|S| Set size

Introduction to the Notation

Traditionally, a node set is represented in terms of a basic data structure that enumerates the XML nodes in the node set; as, for example, in the following example:

node set:={E, J, K, L, N, P, Q, T, W, X}

However, for the technique described in this specification, a node set is instead represented at a higher level, without resorting to an enumeration. For the purposes of this discussion, we will consider a representation in terms of a function node-set( ), against which any node n from the underlying XML document can be tested, and which evaluates to true if, and only if, the node is a member of the node set. That is to say, the node set consists of all those nodes n in the XML document for which node-set(n) evaluates to true.

node set:={n ∈document:node-set(n)}

For example, a node set consisting of all nodes in the document that are not comment nodes would be represented by the following function:

node-set(n):=(node-type(n)≠comment-node)

This function tests the type of the node n and only returns true if it is not a comment node. Alternatively, a node set consisting of a tree from the document rooted at a node s would be represented by the following function:

node-set(n):=is-ancestor-or-self(n, {s})

This function verifies that the node s is n, or one of its ancestors.

is-ancestor-or-self(n, S):=∃m≧0: parent-node$^n$(n)∈S

This function tests whether the node n, or one of its ancestors, is in the set S.

parent-node$^n$(n):=the m$^{th}$ ancestor of the node n

This function evaluates to n itself when m is 0, n's parent when m is 1, etc. The node set depicted in FIG. 2 would be represented by the following function:

node-set(n):=is-ancestor-or-self(n, {E, J})&¬is-ancestor-or-self(n, {M, O})

This function verifies that the node n is a descendant of either E or J, but not of M or O. Fundamentally important to this representation is that the node-set( ) function is not evaluated when creating a node set. This means that the node set is not enumerated when creating a representation of it. Instead, enumeration of the node set is deferred for as long as possible, in order that it is possible to analyze the functional representation subsequently and make a more-intelligent decision about how to process the node set.

In addition to describing a node set within a document, the above notation can be used to describe manipulations performed upon an XML node set.

The typical manipulations that are performed on a node set are operations such as:

selecting only those nodes from the node set that lie within a particular tree;

removing all nodes that match a certain type;

removing all nodes that lie within a particular tree;

retaining only those nodes that match a particular pattern; and so forth.

All of these manipulations can be represented using the nomenclature described above to represent the node set itself. For example, a manipulation that removes all comment nodes from a node set (i.e., restricting the node set to only those nodes that are not comment nodes) would be represented thus:

manipulator$_{no\text{-}comments}$(n):=node-type(n)≠comment-node

Similarly, a manipulation to select only those nodes that lie within the tree rooted at the node s would be represented thus:

manipulator$_{tree\text{-}intersect}$(n):=is-ancestor-or-self(n, {s})

Alternatively, a manipulation to select only those nodes that do not lie within the tree rooted at the node t would be represented thus:

manipulator$_{tree\text{-}subtract}$(n):=¬ is-ancestor-or-self(n, {t})

The result of manipulating a node set is then the result of applying the manipulator function to the node set function using the & operator for restriction (that is, to restrict the node set to only those nodes in it that also match the manipulator function), or the | operator for extension (that is, to extend the node set to additionally include those nodes that match the manipulator function). Consider, for example, a basic node set containing every node from the XML document:

node-set(n):=true//every node is present in the node set.

Applying the comment-removal manipulator to this node set results in a new node set:

node-set (n):=true &(node-type(n)≠comment-node)

Applying the tree-intersection manipulator produces this node set:

node-set (n):=true&(node-type(n)≠comment-node)& is-ancestor-or-self(n, {s})

Finally, applying the tree-subtraction manipulator produces this node set:

node-set (n):=true&(node-type(n)≠comment-node)&is-ancestor-or-self(n, {s})&¬ is-ancestor-or-self(n, {t})

In this manner it is possible to start with a basic node set containing all the nodes in a document and apply to it a sequence of manipulations by combining the node-set function with various manipulator functions. In this way it is possible to produce any potential desired node set, while remaining in the flexible, efficient, high-level representation.

Furthermore, note that manipulating a node set does not involve enumerating the node set. For example, in removing all comments from a node set, this method does not iterate through the node set, removing any node of the offending type. Instead, it performs a manipulation of the representation of the node set, and once a final representation has been derived it can then be evaluated.

The representation and manipulation techniques provided by the invention therefore, comprise a powerful mechanism for computing with node sets that enjoys the benefits of constant-time operation. It is no more computationally or representationally expensive to work with a large node set from a large document than a small node set from a small document because the size of the document being manipulated becomes significant only when the node set is evaluated.

Once a node set has been computed, it will normally be necessary to enumerate the nodes of the node set in order to do useful work with them. Also provided is a method for iterating over the nodes of a node set in document order, that is proportionally expensive with the size of the node set, and largely independent of the size of the underlying XML document.

The iteration method includes two principal steps, as will be described.

The first step is an initial analysis of the node set, to determine how to process it efficiently. The second step is the actual iteration, which is performed efficiently by employing the results of the initial analysis.

The node set representation derived by this technique is a characterization of the nodes of the node set, having, for example, a form as described above. This is a compact and efficient representation, that readily lends itself to node set manipulation, as has been described. The node set contains every node from the document that is accepted by a node set function.

One straightforward technique to enumerate the node set (i.e., to iterate over the nodes of the node set) is to test every node from the document against the function, selecting only those nodes for which the node set function evaluates to true. However, for node sets that comprise just a small subset of the nodes of the document, this can be an inefficient solution. Instead, embodiments of this invention provide a technique for analyzing the description function in order to determine a much more efficient way to enumerate the node set.

Figure 2:
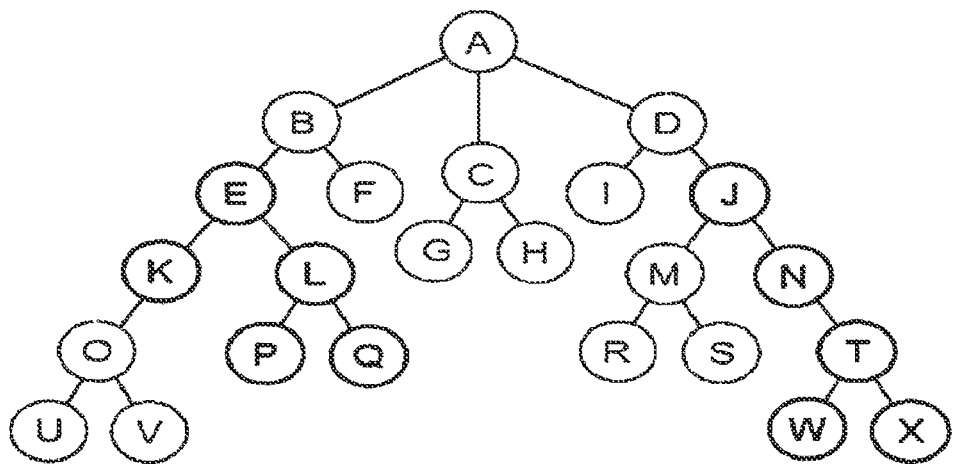
FIG. 2 illustrates a node set within another small XML document.

For example, consider the node set defined by the following description function applied to the node set of FIG. 2:

node-set(n):=is-ancestor-or-self(n, {E, J})&¬ances-tor-or-self(n, {M, O})&(n∉{L, T})

Figure 4:
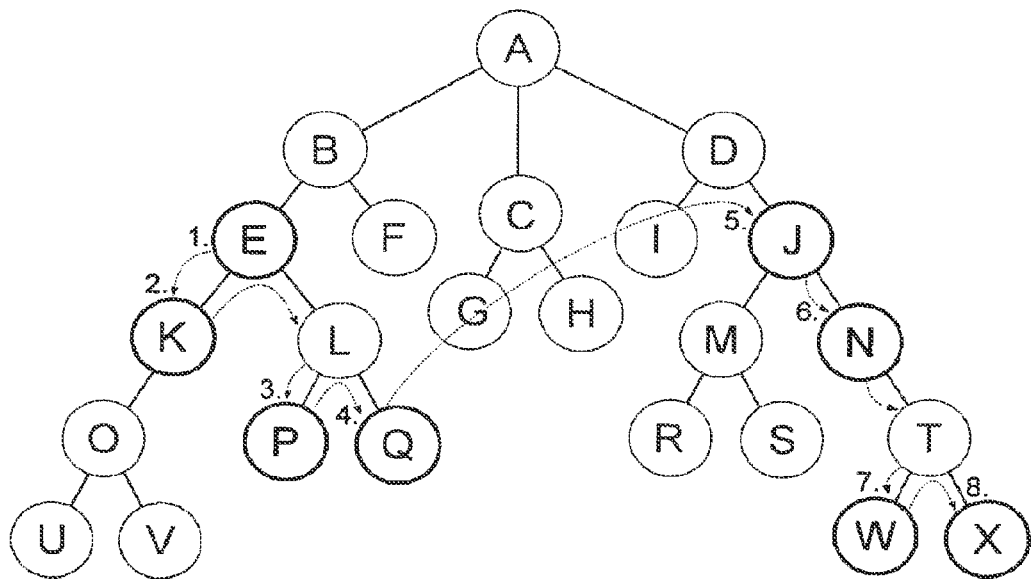
FIG. 4 shows the path of an efficient document-order enumeration of a node-set within an XML document.

This node set includes only those nodes that are a descendant of E or J, that are not a descendant of M or O, and that are neither L nor T. By inspection, it will be seen that this set can be enumerated as illustrated in FIG. 4, to give the document order set {E, K, P, Q, J, N, IV, X}. The analysis technique described below will determine algorithmically that it is only necessary to iterate over the trees rooted at E and J, that the trees rooted at M and O can be ignored, and that the only node test required is n ∉{L, T}.

While the description of this analysis is presented in terms of node sets that are represented by characteristic functions, the technique can equally be applied to any other high-level non-enumerative representation, as all such representations are directly equivalent to the formula-based representation. Such representations include, without limitation, English-language statements and computer code.

Supporting Mathematics

First, to state some axioms of logical algebra:

a) x&true==x

The logical conjunction (and) of any expression x with truth is x itself.

b) x&y==y&x

Logical conjunction is commutative.

z&(y & z)==(x&y) & z

Logical conjunction is associative.

By application of axioms a, b, and c, it is possible to decompose any node set function into the following form:

node-set(n):=forest-intersections(n)&forest-subtractions(n)&other-terms(n) The three terms in this expression have the following forms:

forest-intersections(n):=is-ancestor-or-self(n, $S_0$)& ... &is-ancestor-or self(n, $S_s$)

forest-subtractions(n):=¬is-ancestor-or-self(n, $T_0$)& ... &¬-ancestor-or-self(n, $T_t$)

other-terms(n):=any terms in the node set function that do not fit into the above categories, for example, node type tests, node filtering expressions, disjunctions, etc.

Note that any of these terms may be empty, in which case, it evaluates to true.

Figure 5:
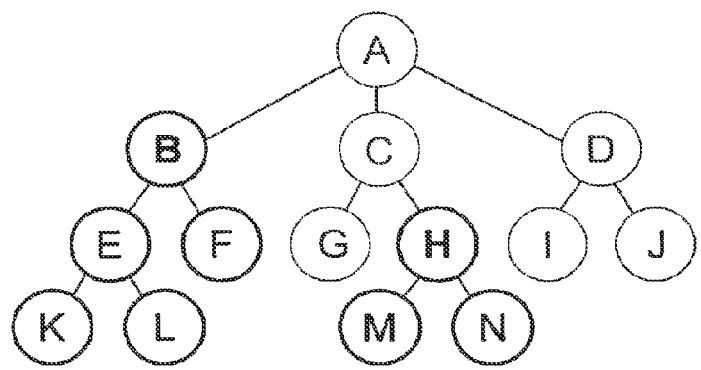
FIG. 5 illustrates the occurrence of trees and forests of nodes within a node set.

Now, there are axioms that relate to trees and forests within a node set. In terms of graph theoretic terminology, and this specification, a tree is a complete, connected, directed, acyclic graph of nodes from an underlying XML document tree; i.e., a subtree of the document. "Complete" means that the tree includes all descendent nodes in the underlying XML document. A forest is a disjoint set of trees. FIG. 5, illustrates two trees B, H that together constitute a forest within a node set. Each forest is represented by a set of the root, or apex nodes of the trees in the forest. The trees are complete and directed, so each is completely defined by its root node.

The following axioms apply to trees and forests:

d) $forest_1 \cap forest_2 = \{t \in forest_1 : \exists t' \in forest_2 : t \subseteq t'\}$
∪$\{t \in forrst_2 : \exists t' \in forest_1 : t \subseteq t'\}$ The intersection of two forests over nodes from one XML document is another forest containing all those trees in either forest that are a subset of any tree in the other forest. The logical equivalent is:

(w|x)&(y|?==((w&y)|(w&z)|(x&y)|(x&z))

e) $forest_1' \cap forest_x' = (forest_1 \cup forest_2)'$

The intersection of two inverted forests over nodes from one XML document is the inverse of the forest resulting from the union of the two forests. The logical equivalent is ¬(w|x)&¬(y|?)==¬(w|z|y|?)

f) Forest union is commutative and associative, as is forest intersection.

By observing that forest-intersections( ) has the form of an intersection of forests, and forest-subtractions( ) has the form of an intersection of inverted forests, and applying the graph axioms d), e) and f) above, it is possible to decompose the node set further:

node-set(n):=is-ancestor-or-self(n, S)&¬is-ancestor-or-self(n, T)&other-terms(n)

The two sets in this expression are computed as follows:

$S := (S_0 \cap_{forest} \ldots \cap_{forest} S_s) \backslash_{forest} T$ $T := T0 \cup_{forest} \ldots \cup_{forest} T_t$ Note that if there are no terms in forest-intersections( ), then S is the set containing just the root node of the XML document. If there are no terms in forest-subtractions( ), then T is the empty set.

Figure 6:
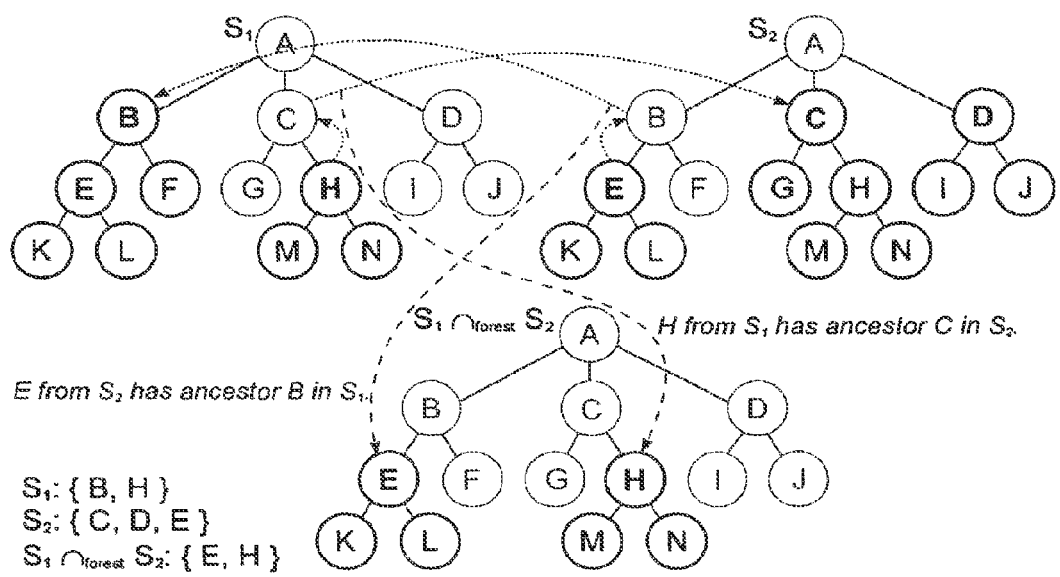
FIG. 6 illustrates the intersection of forests in a node set that are represented by the sets of their root nodes.

In these expressions, $S_i$ and $T_j$ are forests, each represented by a set of the trees' root nodes. The operators $\cup_{forsest}$, $\cap_{forest}$ and $\backslash_{forest}$ refer to forest union, forest intersection and forest subtraction. It can be proved that these operations may be performed efficiently without enumerating the nodes of the trees, as follows:

g) $S_1 \cap_{forest} S_2 = \{s \in S_1: \exists m \geq 0, s' \in S_2: s' = parent\text{-}node^m(s)\}$
∪$\{s \in S_2 : \exists m \geq 0, s' \in S_1 : s' = parent\text{-}node^m(s)\}$ The intersection of two forests, represented by the sets of their root nodes, can be computed in time proportional to the size of the sets multiplied by the height of the underlying tree, by selecting those roots from either forest that have an ancestor in the other forest. This relationship is depicted in FIG. 6.

h) $T1 \cup_{forest} T2 = T1 \cup T2$

The union of two forests, represented by the sets of their root nodes, can be computed in time proportional to the size of the sets by forming the union of the two sets. There is some redundancy in the resulting representation, but this is not significant.

i) $S \backslash_{forest} T = \{s \in S: \neg \exists m \geq 0, t \in T: t = parent\text{-}node^m(s)$
& ¬∃m>0, s'∈S:s'=parent-node$^m$(s)}

The subtraction of two forests, represented by the sets of their root nodes, can be computed in time proportional to the size of the sets multiplied by the height of the underlying tree by selecting those roots from the minuend forest that have no ancestor in the subtrahend forest. In addition, we combine this with a filter to remove any redundant nodes in the resulting minuend forest. (A node is redundant if it is the descendant of another node in the forest.)

The decomposed form of the node set function allows a node set to be strictly and completely define a as follows:

1. All nodes in the node set are descendants of some node in S.
2. No nodes in the node set are descendants of some node in T.
3. All nodes in the node set are accepted by the function other-terms( ).

The analysis that has been presented allows this strict node set definition (i.e., points 1 to 3 above) to be made, and presents an efficient method to compute the sets S and T and the function other-terms( ). Moreover, this analysis can be performed in time linear with the number of terms in the original node set function (typically a small constant), linear with the number of nodes in the sets $T_j$ (typically a small constant), and linear in the number of nodes in the sets $S_i$ (typically a small constant) multiplied by the height of the tree (typically the logarithm of its size), which can be expressed as:

$$O(n_{terms}+\Sigma|T_j|+\Sigma|S_i|*\log(N))\approx O(\log(N))$$

Sorting a Node Set

Figure 7:
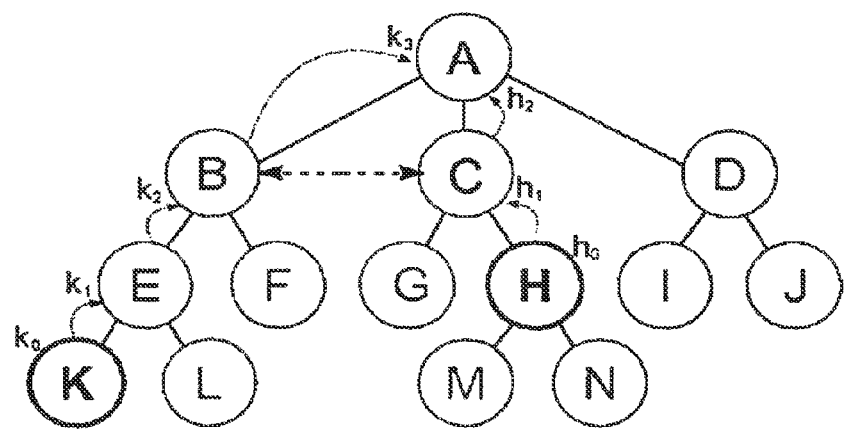
FIG. 7 illustrates an example of ordered enumeration of the nodes of a node set.

The document order of the nodes in S will be used during iteration of the node set. In some cases, it is possible to guarantee, from the initial construction of S, that its contents are already ordered. In such cases, no work is required. Otherwise, a sorting algorithm must be employed. A document-order comparator is needed to support the sorting algorithm The relative order of two arbitrary nodes, a and b, in a tree can be determined in time proportional to the height of the tree (typically the logarithm of its size) as will now be described with reference to FIG. 7.

Let $a_n$ be parent-node$^n$(a) and $b_n$ be parent-node$^n$(b).
Let i,j be the smallest values such that $a_i=b_j$.
Then $a_o$ and are sibling nodes, and their relative order can be determined in a linear search of, typically, a small constant number of siblings.

The relative order of a and b is equal to the relative order of $a_{i-1}$ and $b_{j-1}$.

Using this comparator and a standard sorting algorithm, the document order of S can be determined in time $O(|S|*\log(|S|)*\log(N))\approx O(\log(N))$.

Iteration of the Node Set

After performing the above analysis it is possible to iterate, in document order, over the nodes of the node set, as will now be described.

A. Iterate over the root nodes s, from S, in document order. From 1 above, it is seen that all nodes in the node set are descendants of one of these nodes, so it is not necessary to process any other parts of the document.
B. Use a standard depth-first tree traversal algorithm to iterate over the descendant nodes n of the tree rooted at s. Trees in the document are disjoint, and the relative order of a set of disjoint trees is equal to the relative order of the root nodes of the trees. Therefore, if each tree is processed in document order, and for each tree, its nodes are processed in order, then all of the nodes in the node set will be processed in document order.
C. Do not process or descend into any node n that is a member of T. From 2 above, it is apparent that no nodes in the node set are descendants of one of these nodes.
D. Test each remaining node n against the function other-terms( ). From 3 above, if this function returns true, then n is the next node in the document-order traversal of the node set.

The cost of this iteration process is linear in the number of nodes in the node set. This assumes that the other-tests( ) function does not reject a majority of nodes; this assumption will be true for most common node sets, in which the other-tests( ) function will, at most, reject nodes that have an unwanted type. The method does not process parts of the XML document outside of major trees of interest, and does not process trees within these parts that are specifically excluded. The overall cost of this technique, which is the cost of analysis plus the cost of iteration, is therefore: $O(\log(N)+M)\approx O(M)$.

Specific Application: Cryptographic Signing of Xml Documents

Figure 8:
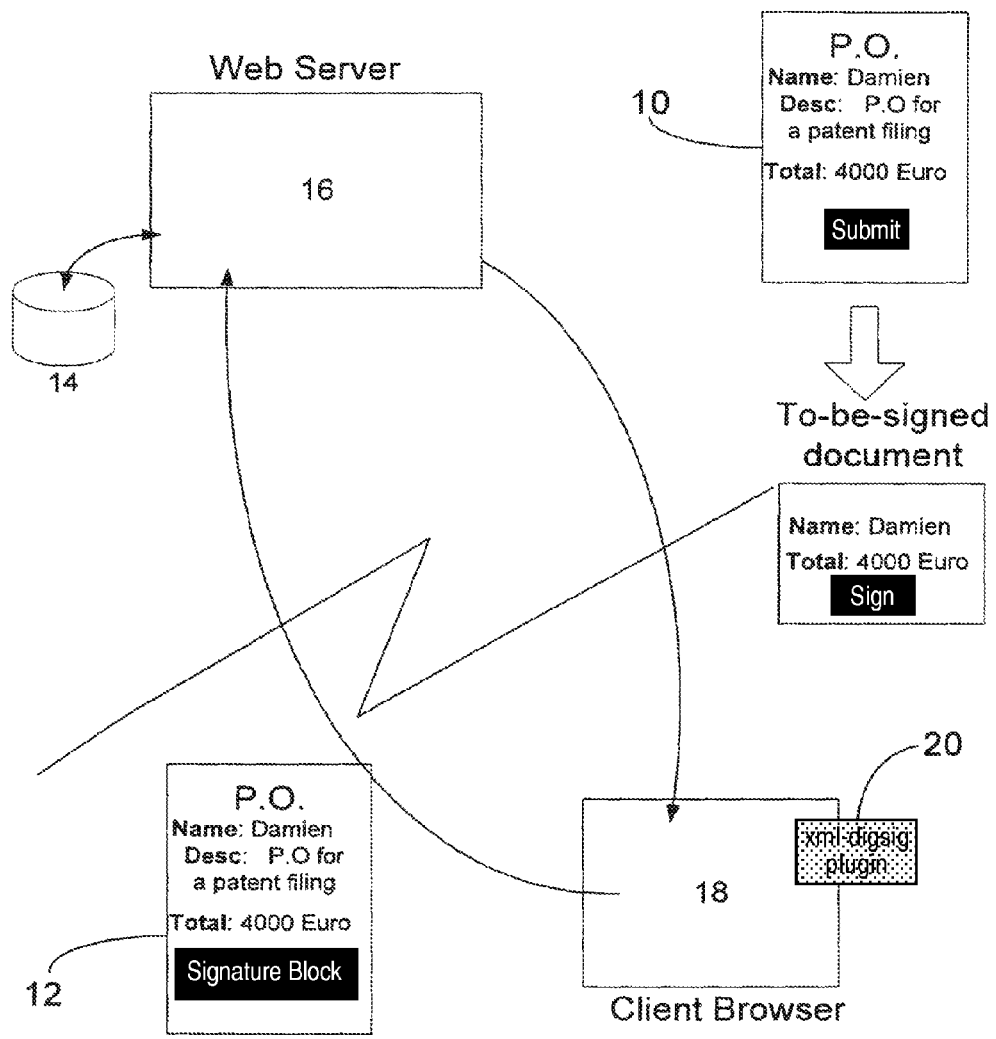
FIG. 8 shows diagrammatically interaction between a server and a client in which a user at the client applies a digital signature to the document.

FIG. 8 illustrates a scenario where a user has to fill in, and then digitally sign some parts of a document 10. In this example, the document is a purchase order (PO). The signed PO 12 is then stored in a database 14. Assume the user's browser 18 can support XML digital signatures, this being enabled with a software plugin 20 that embodies aspects of this invention. The P.O. is an XML document that is retrieved from an internal Web server 16.

Documents and parts of documents on the server are identified by way of a uniform resource identifier. The XML digital signature specification employs uniform resource indicators (URIs) to identify the data that are to be protected by the digital signature. Each URI is dereferenced and the result is either an XML node set, or a stream of binary data. The different types of URI that, when dereferenced in embodiments of the invention, produce node sets, are described below; along with the resulting node sets, as represented by a node-set function. That is to say, the node set described by a URI can be represented as a function of the description language described above, or any equivalent high-level representation.

A whole-document URI has an empty value. It dereferences to a node set containing every node in the document with the exception of comment nodes. The equivalent function is:

node-set$_{whole-document}$(n):=node-type(n)$\neq$comment-node

A bare-name URI consists of a hash character (#) followed by a label value. It dereferences to a node set containing every node of a particular tree in the document with the exception of comment nodes; the tree is rooted at an element node that is identified by the label value from the URI. The equivalent function is:

node-set$_{bare-name}$(n):=is-ancestor-or-self(n, {e}) &(node-type(n)$\neq$comment-node) e:=get-element-by-id(label)

An Xpointer URI consists of a hash character (#) followed by an expression that conforms to the Xpointer language described above. It dereferences to a node set containing every node from a forest of trees in the document. The trees are rooted by a set of nodes that is computed by evaluating the Xpointer expression. The equivalent function is:

node-set$_{x-pointer}$(n):=is-ancestor-or-self(n, X)
X:=evaluate-x-pointer( )

Further, it is possible to analyze the Xpointer expression itself and, in many cases, determine the document order of the nodes in X without explicitly sorting them. If the Xpointer expression consists solely of in-order Xpath axes and Xpath predicates, then it can be evaluated in document order. If it consists solely of reverse-order Xpath axes and Xpath predicates, then it can be evaluated in reverse document order. Otherwise, evaluation will be unordered, so an explicit sorting operation will be required.

Representation of The XML Signature Transforms

The XML digital signature specification also defines an extensible transform mechanism that allows data to be transformed, or manipulated, prior to the signing process. Some transforms produce node sets, others consume node sets, while others manipulate node sets.

Various transforms that relate to node sets are described below, along with how they modify the node sets, as represented by a manipulator function. Other transforms from other specifications that related to node set processing can be expressed similarly:

Enveloped Signature: The enveloped signature transform removes a tree of nodes from the node set. The root of the tree is the XML signature element that contains the enveloped signature transform itself:

$manipulator_{enveloped-signature}(n) := \neg \text{ is-ancestor-or-self}(n, \{x\})$ x:=signature-element Xpath Filter: The Xpath filter transform restricts the node set to only those nodes in it that are also accepted by an Xpath expression:

$manipulator_{x-path}(n) := \text{evaluate-x-path}(n)$

The evaluate-x-path( ) function is a Boolean function, evaluated in the context of each node from the input node set. This type of expression falls into the category of other-terms( ) in described above; however, use of this transform is uncommon because of its poor performance profile.

Xpath Filter 2.0: The Xpath filter 2.0 transform is a more efficient form of Xpath filtering. A sequence of Xpath expressions are evaluated to compute a filter for the input node set:

$manipulator_{x-path-2.0}(n) := \text{x-path-filter}(n)$

In this transform, x-path-filter( ) is a function that always has the following form:

| | |
|---|---|
| x-path-filter ::= | \| true |
| | \| xpath-filter' & is-ancestor-or-self(n, X) |
| | \| xpath-filter' & ¬ is-ancestor-or-self(n, X) |
| | \| xpath filter' \| is-ancestor-or-self(n, X) |

That is to say, the manipulator function representing this transform consists of a sequence of optionally negated is-ancestor-or-self( ) operations, combined in conjunctions and disjunctions. Most typical formulations can therefore successfully be decomposed during node set analysis into the form required for efficient handling by this node set processing technique. As with Xpointer references, it is possible to analyze the Xpath expressions used by this transform and, in many cases, determine that the sets used by this transform are already ordered, thereby, eliminating any need to sort them.

EXAMPLE APPLICATION

Figure 9:
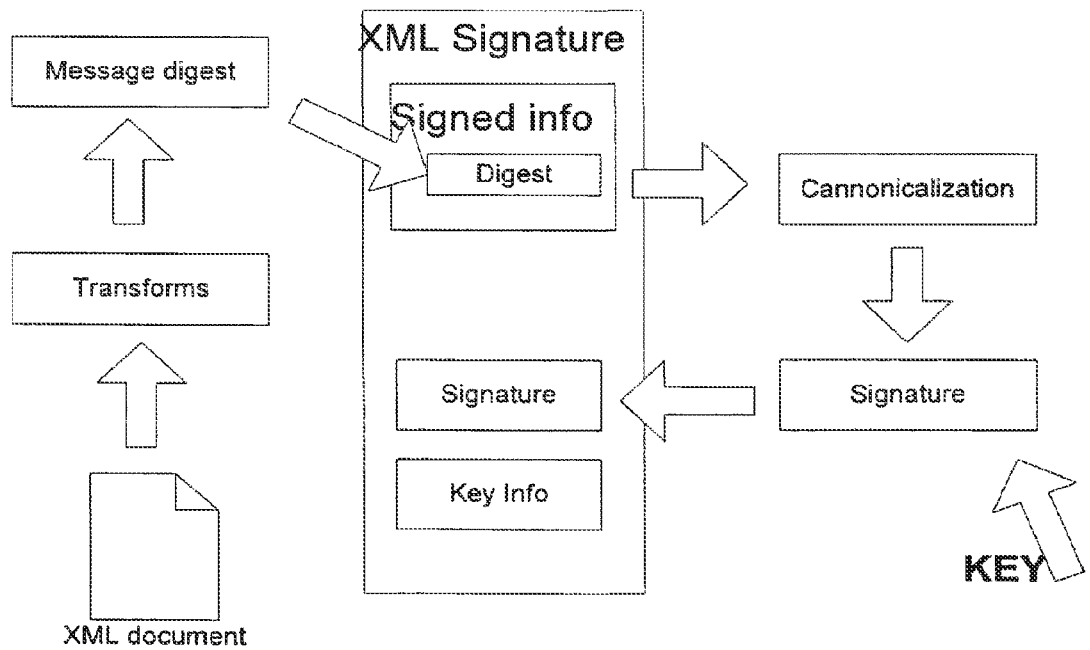
FIG. 9 is a diagram illustrating operations performed on an XML document during signing.

A sequence of events in an example interaction between the user and the server can be summarised as follows:

1. The user points the browser 18 at the URI for the P.O. that he wishes to fill in. The browser retrieves the P.O. from the web server 16.
2. The user fills in the form (i.e. enters his name, description of reason for P.O, P.O. amount).
3. The user clicks on a "Submit" button within the display of the form on their browser.
4. The user is now displayed a new XML document. This document only contains those parts of the original P.O. that the user is actually going to sign. This is important because the user needs to see exactly what he is going to sign.
5. If the user is happy that the information is correct he presses a "Sign" button displayed within the document.
6. The plugin is now activated to perform the signing process. First, the new XML document (i.e. the document containing the info to be signed) has a transform applied to it. The purpose of the transform is to remove any unwanted data from the XML document, such as comments, and other unnecessary matter. As noted above, canonicalization is itself a transform so part of the transform is to "canonicalize" the data into a byte stream. Next, a message digest is applied to the byte stream. The result of the message digest is then placed in an XML signed info structure (this structure contains details of the digest algorithm used, the signature algorithm used, and other information needed by a recipient to verify the signature). The signed info structure is itself canonicalized (i.e. transformed into a byte stream). This byte stream is then used with a key to generate a signature. The signed info structure and signature are then placed in the original XML P.O. document (which will be referred to as signed document 12). The sequence of events described in this paragraph is represented diagrammatically in FIG. 9.
7. The signed document 12 is posted back to a servlet running on the web server 16, which places it into a database 14 for safe storage.

Note that the above procedure involves two steps that perform canonicalization of a node set. Fundamental to all such node-set canonicalization, serialization and analysis algorithms is the requirement to iterate, in document order, over the nodes from the node set. Having expressed the result of XML signature reference processing in terms of a node-set function, and the operation of XML signature transforms in terms of manipulator functions, it is then possible to employ the analysis and iteration techniques described above to iterate over the node sets, and thereby implement XML canonicalization required to support the digital signing operation in an extremely efficient manner.

The following listings set forth an example implementation of a method of signing an XML document by way of the present invention.

The following uses generic element names in the interests of generality and compactness. An example of an authorization field would be the authorization from a credit card company that gets inserted into a PO by a merchant, where the customer has already signed their credit card information.

Listing 1 is an example XML document. The document includes a header containing some signatures followed by a body containing various parts authored by different people. As people add further parts no signature pre-existing within the document should be broken. Within each body there is an authorization section that is going to be filled in later on, so this should not be included in any of the signatures.

Consider an author "Merlin" of several parts within the document. The signature applied by that author should take into account those parts of the document that are underlined.

The header includes a signature reference URI. The signature reference URI broadly identifies the node set that the author Merlin will be signing. Subsequent transformations will modify the node set targeted by the signature reference URI, so the URI may be quite coarse-grained. At least three types of signature reference can be used (we will ignore differences in comment handling between these types).

Listing 2 shows an example of a signature reference URI including an Xpointer reference.

The example URI shown in listing 2:

xpointer(/Document/Body/Part[@Author='merlin'])

selects all Part elements that Merlin authored, as shown underlined in Listing 2. Note that this Xpointer consists of three forwards axes (/Document, /Body, /Part) and a simple predicate (@Author='merlin') therefore, upon evaluation of the URI, the result is already to in document order.

After the URI is evaluated, a transform must be applied to remove the authorization parts. For this, the Xpath filter transform 2.0 in subtract mode can be used, subtracting the node trees identified by the expression:

/Document/Body/Part/Authorization

That is to say, remove every Authorization element that is a child of a Part that is a child of a Body that is a child of a Document that is the root node. The result is the underlined regions of Listing 3.

An important limitation to this technique is that Xpointer references are not supported by all toolkits; this is not a required feature for XML signature conformance. Therefore, this technique cannot always be used, so alternative approaches are provided within the scope of the invention.

An alternative approach it to use a bare name URI. Bare name URIs rely on a schema/DTD to identify certain attributes as having a type ID. When parsing a document, the XML parser builds an index of all attributes of this type, allowing extremely efficient location of elements in the document with a particular ID value. In this case, the schema/DTD must specify that the ID attribute of the Body element has type ID.

This example uses the bare name URI #body-1234 to select part of the document for signing. Listing 4 shows underlined the node set of the document selected by a bare name URI. After making this selection, a transform is used to select only the parts that Merlin wrote, and then to remove the authorization parts. To achieve this, it is possible to use the Xpath filter transform 2.0 in intersect and then subtract mode; first selecting only the node trees identified by the expression /Document/Body/Part[@author='merlin'] (similar to the Xpointer expression described above) and then subtracting the node set identified by the expression /Document/Body/Part/Authorization. The result is shown in Listing 5.

Use of bare name references requires that the schema or DTD identify attributes of type ID, or that the application can make this identification itself. In some cases, this is not possible. For example, when a pre-existing schema is defined without support for any appropriate attributes; e.g., if the author of the Body schema was not aware of XML signatures, and so defined a schema that did not include an ID attribute. This is common with 'legacy' DTDs. To avoid this restriction, a third mechanism is provided.

The third mechanism uses a whole-document URI. Whole-document URIs (represented by an empty string) simply select every node in the entire document (including the reference itself). The reference code fragment is:

<Reference URI=""> . . . </Reference>

A transform is then applied to select only the parts that Merlin wrote, and then to remove the authorization parts; this is the same as the previous case. The final document is shown in Listing 6.

Now, consider how the efficient technique for selecting node sets, as described above, can be applied to these three cases. For simplicity, the three Part elements in the document will be referred to as $Part_1$, $Part_2$ and $Part_3$; similarly, the three Authorization elements as $Auth_1$, $Auth_2$ and $Auth_3$.

As derived above:

node-set$_{whole-document}$(n) := node-type(n) ≠ comment-node
node-set$_{bare-name}$(n) := is-ancestor-or-self(n, { e }) & (node-type(n) ≠ comment-node)
node-set$_{x-pointer}$(n) := is-ancestor-or-self(n, X)
manipulator$_{x-path-2.0}$(n) := x-path-filter(n)
x-path-filter ::=    | true
                     | xpath-filter' & is-ancestor-or-self(n, X)
                     | xpath-filter' & ¬ is-ancestor-or-self(n, X)
                     | xpath-filter' | is-ancestor-or-self(n, X)

Implementing the Xpointer URI:

First dereference the Xpointer URI and come up with a node set:

is-ancestor-or-self(n, {$Part_1$, $Part_3$})

The Xpath Filter 2.0 manipulator is this:

¬ is-ancestor-or-self(n, {$Auth_1$, $Auth_2$, $Auth_3$})

Apply this to the initial node set to get:

is-ancestor-or-self(n, {$Part_1$, $Part_3$}) & ¬ is-ancestor-or-self(n, {$Auth_1$, $Auth_2$, $Auth_3$})

This function defines the node set shown in Listing 3 and example code to implement the method is presented in Listing 7.

Implementing the Bare Name URI:

First dereference the bare name URI and define a node set:

is-ancestor-or-self(n, {Body}) & (node-type(n) ≠ comment-node)

The Xpath Filter 2.0 manipulator is this:

is-ancestor-or-self(n, {$Part_1$, $Part_3$}) & ¬ is-ancestor-or-self(n, {$Auth_1$, $Auth_2$, $Auth_3$})

Apply this to the initial node set and get:

is-ancestor-or-self(n, {Body}) & (node-type(n) ≠ comment-node) & is-ancestor-or-self(n, {$Part_1$, $Part_3$}) & ¬is-ancestor-or-self(n, {$Auth_1$, $Auth_2$, $Auth_3$})

Then apply axiom d:

is-ancestor-or-self(n, {$Part_1$, $Part_3$}) & ¬ is-ancestor-or-self(n, ($Auth_1$, $Auth_2$, $Auth_3$)) & (node-type(n) ≠ comment-node)

This now produces a node set in the correct form to be processed by the efficient technique provided by this invention. Example code to implement the method is presented in Listing 8.

Implementing the Whole-Document URI

First dereference the whole document URI and define a node set:

node-type(n) ≠ comment-node

The Xpath Filter 2.0 manipulator is this:

is-ancestor-or-self(n, {$Part_1$, $Part_3$}) & ¬ is-ancestor-or-self(n, {$Auth_1$, $Auth_2$, $Auth_3$})

Apply this to the initial node set and to produce:

is-ancestor-or-self(n, {$Part_1$, $Part_3$}) & ¬ is-ancestor-or-self(n, {$Auth_1$, $Auth_2$, $Auth_3$}) & (node-type(n) ≠ comment-node)

This now defines a node set in the correct form to by processed by techniques provided by the invention. Example code to implement the method is presented in Listing 9.

No matter which formulation of XML signature reference is used, the technique is similarly straightforward and efficient. The node sets are never enumerated up front, so even huge node sets are expressed in a simple, constant-size representation. This allows the use of whole-document URIs that are subsequently transformed down just as efficiently as Xpointer URIs that need less subsequent processing.

Once the node set has been defined in accordance with one of the above examples, the node set is iterated. With the following node set.

Is-ancestor-or-self(n, {$Part_1$, $Part_3$}) & is-ancestor-or-self (n, {$Auth_1$, $Auth_2$, $Auth_3$})

Now, the object is to iterate over this, in order to perform canonicalization.

First, determine the document order of $Part_1$ and $Part_3$. The Xpath/Xpointer analysis in this case shows that they are already ordered (the Xpath/Xpointer consists of only forward axes). Even if they are not, their order can be determined readily by finding their nearest common ancestor (Body) and looking at its children. This operation is performed at a trivial cost, compared with the size of the document.

Next, iterate over all the children of $Part_1$, but not descending into $Auth_1$, $Auth_2$ or $Auth_3$ (in this particular case, the iteration does not descend into $Auth_1$).

Next, iterate over all the children of $Part_3$, but not descending into $Auth_1$, $Auth_2$ or $Auth_3$ (in this particular case, the iteration does not descend into $Auth_3$).

The process is now complete. Note that no time has been wasted by enumeration of any unimportant Part elements in the document, and no time has been spent descending unnecessarily into the Authorization trees. Therefore, the cost of this technique is linear in the size of the output node set, and not in the size of any intermediate node sets, as is the case with conventional techniques.

Finally, Listing 10 presents an example of how the methods provided by an API can be used to perform methods embodying the invention in a Java (r.t.m.) application.

Listing 1—Example XML Document

```
<Document>
   <Header>
      <Signature>
   </Signature>
</Header>
<Body Id="body-1234"
<Part Author="merlin">
<Authorization>
</Authorization>
</Part>
<Part Author="damien">
<Authorization>
</Authorization>
</Part>
<Part Author="merlin">
<Authorization>
</Authorization>
</Part>
</Body>
</Document>
```

Listing 2—Example XML Document Showing a Signature Reference URI Including an Xpointer Reference

```
<Document>
<Header>
<Signature>
<Reference
   URI="#xpointer(/Document/Body/Part
[@Author='merlin'])">
</Reference>
</Signature>
</Header>
<Body Id="body-1234"
<Part Author="merlin">
<Authorization>
</Authorization>
</Part>
```

```
<Part Author="damien">
<Authorization>
</Authorization>
</Part>
<Part Author="merlin"
<Authorization>
</Authorization>
</Part>
</Body>
</Document>
```

Listing 3—Example XML Document Showing a Signature Reference URI Including an Xpointer Reference with Authorisation Parts Deselected

```
<Document>
<Header>
<Signature>
<Reference
   URI="#xpointer(/Document/Body/Part
[@Author='merlin'])">
<Xpath Filter="subtract">
   /Document/Body/Part/Authorization
</Xpath>
</Reference>
</Signature>
</Header>
<Body Id="body-1234">
<Part Author="merlin">
<Authorization>
</Authorization>
</Part>
<Part Author="damien">
<Authorization>
</Authorization>
</Part>
<Part Author="merlin">
<Authorization>
</Authorization>
</Part>
</Body>
</Document>
```

Listing 4—Example XML Document Showing Use of a Bare Name URI

```
<Document>
<Header>
<Signature>
<Reference
   URI="#body-1234">
</Reference>
</Signature>
</Header>
<Body Id="body-1234"
<Part Author="merlin"
<Authorization>
</Authorization>
</Part>
<Part Author="damien>
<Authorization>
</Authorization>
</Part>
<Part Author="merlin">
<Authorization>
</Authorization>
</Part>
</Body>
</Document>
```

Listing 5—Modification of the Document of Listing 4 Using a Xpath to Select Only Elements Belonging to User Merlin without Authorisation Elements

```
<Document>
<Header>
<Signature>
<Reference
    URI="#body-1234">
<Xpath Filter="intersect">
    /Document/Body/Part[@Author='merlin']
</Xpath>
<Xpath Filter="subtract">/Document/Body/Part/Authoriza-
tion
</Xpath>
</Reference>
</Signature>
</Header>
<Body Id="body">
<Part Author="merlin">
<Authorization>
</Authorization>
</Part>
<Part Author="damien">
<Authorization>
</Authorization>
</Part>
<Part Author="merlin">
<Authorization>
</Authorization>
</Part>
</Body>
</Document>
```

Listing 6—Example Document Using a Whole-Document URI

```
<Document>
<Header>
<Signature>
<Reference
    URI=" ">
<Xpath Filter="intersect">
    /Document/Body/Part[@Author='merlin']
</Xpath>
<Xpath Filter="subtract">
    /Document/Body/Part/Authorization
</Xpath>
</Reference>
</Signature>
</Header>
<Body Id="body">
<Part Author="merlin">
<Authorization>
</Authorization>
</Part>
<Part Author="damien">
<Authorization>
</Authorization>
</Part>
<Part Author="merlin">
<Authorization>
</Authorization>
</Part>
</Body>
</Document>
```

Listing 7—Code to Implement Xpointer URI

```
// First we load and parse the XML document containing the data to be
// signed.
DocumentBuilder builder= . . . ;
Document document=builder.parse ( . . . );
// Select the URI
String uri="#xpointer(/Document/Body/Part[@Author='merlin'])";
// Then build the Xpath Filter 2.0 transform. This is used to subtract
// the node trees identified by "/Document/Body/Part/Authorization"
String expr="/Document/Body/Part/Authorization";
XMLDSIGXPathFilterTransform.Filter filter=
new XMLDSIGXPathFilterTransform.Filter
(XMLDSIGXPathFilterTransform._Subtract, expr);
XMLDSIGTransform transform=
new XMLDSIGXPathFilterTransform (CollectionUtil.arrayList (filter), null);
// Then build the XML signature structure
XMLDSIGTransforms transforms=new XMLDSIGTransforms (CollectionUtil.arrayList (transform));
XMLDSIGReference reference=new XMLDSIGReference (null, uri, null, transforms);
XMLDSIGSignedInfo signedInfo=new XMLDSIGSignedInfo (null, CollectionUtil.arrayList (reference));
// Load the key that we're going to use when performing the signing
// operation
XMLDSIGKeyInfo keyInfo= . . . ;
// Create an XML digital signature object
XMLDSIGSignature signature=new XMLDSIGSignature (null, signedInfo, null, keyInfo, null);
// Select signing parameters i.e. set the digest alg, signature alg,
// etc.
XMLDSIGSignContext signer=
// Identify the location (document, parent node, sub node) where the
// XML signature block is to be placed once generated. In identifying
// the document where the signature is to be placed we are also
// identifying the document to be signed.
Node parent= . . . ;
Node nextSibling= . . . ;
//Generate the signature; all node set processing is done internally signature.sign (parent, nextSibling, signer);
```

Listing 8—Code to Implement Bare-Name Uri

```
// First we load and parse the XML document containing the data to be
// signed.
DocumentBuilder builder= . . . ;
Document document=builder.parse ( . . . );
// First select the URI
String uri="#body-1234";
// Then build the Xpath Filter 2.0 transform String expr0="/Document/Body/Part[@Author='merlin']";
XMLDSIGXPathFilterTransform.Filter filter0=new XMLDSIGXPathFilterTransform.Filter
(XMLDSIGXPathFilterTransform Intersect, expr0);
```

```
String expr1="/Document/Body/Part/Authorization";
XMLDSIGXPathFilterTransform.Filter    filter1=new
XMLDSIGXPathFilterTransform.Filter
    (XMLDSIGXPathFilterTransform._Subtract, expr1);
XMLDSIGTransform transform=new XMLDSIGXPath-
FilterTransform
    (CollectionUtil.arrayList (filter0, filter1), null);
// Then build the XML signature structure XMLD-
SIGTransforms   transforms=new   XMLDSIGTransforms
(CollectionUtil.arrayList (transform)); XMLDSIGReference
reference=new XMLDSIGReference (null, uri, null, trans-
forms); XMLDSIGSignedInfo signedInfo=new XMLDSIG-
SignedInfo  (null,  CollectionUtil.arrayList  (reference));
XMLDSIGKeyInfo keyInfo= . . . ; XMLDSIGSignature
signature=new XMLDSIGSignature (null, signedInfo, null,
keyInfo, null);
// Select signing parameters/location
XMLDSIGSignContext signer= . . . ;
Node parent= . . . ;
Node nextSibling=
// Generate the signature; all node set processing is done
internally signature.sign (parent, nextSibling, signer);
```

Listing 9—Code to Implement Whole-Document URI

```
// First we load and parse the XML document containing
the data to be
// signed.
DocumentBuilder builder= . . . ;
Document document=builder.parse ( . . . );
// First select the URI
String uri=" ";
// Then build the Xpath Filter 2.0 transform String expr0="/
Document/Body/Part[@Author='merlin']";
    XMLDSIGXPathFilterTransform.Filter    filter0=new
XMLDSIGXPathFilterTransform.Filter
    (XMLDSIGXPathFilterTransform._Intersect, expr0);
    String    expr1="/Document/Body/Part/Authorization";
XMLDSIGXPathFilterTransform.Filter filter1=new XMLD-
SIGXPathFilterTransform.Filter
    (XMLDSIGXPathFilterTransform._Subtract,    expr1);
XMLDSIGTransform transform=new XMLDSIGXPathFil-
terTransform
    (CollectionUtil.arrayList (filter0, filter1), null);
// Then build the XML signature structure XMLD-
SIGTransforms   transforms=new   XMLDSIGTransforms
(CollectionUtil.arrayList (transform)); XMLDSIGReference
reference=new XMLDSIGReference (null, uri, null, trans-
forms); XMLDSIGSignedInfo signedInfo=new XMLDSIG-
SignedInfo  (null,  CollectionUtil.arrayList  (reference));
XMLDSIGKeyInfo keyInfo= . . . ; XMLDSIGSignature
signature=new XMLDSIGSignature (null, signedInfo, null,
keyInfo, null);
// Select signing parameters/location XMLDSIGSignCon-
text signer= . . . ;
    Node parent= . . . ;
    Node nextSibling= . . . ;
// Generate the signature; all node set processing is done
internally signature.sign (parent, nextSibling, signer);
```

Listing 10—Example Java Application code

```
//
Creating a node set containing all the nodes in an XML
document
// Document document= . . . ;
Filter always
=new ConstantFilter (true);
// create a node set in the document with all nodes NodeSet
nodeSet
=new NodeSet (document, always);
//
Creating a node set containing all the non-comment nodes
in an XML document
//
//Document
document= . . . ;
// create a formula to remove comment nodes
Filter comments
=new TypeFilter (Node.COMMENT_NODE);
Filter noComments
=new NotFilter (comments);
// create a node set in the document with no comment nodes
NodeSet nodeSet
=new NodeSet (document, noComments);
//
// Manipulating a node set to remove a subtree
//
NodeSet nodeSet= . . . ; Node root= . . . ;
// create a formula to remove a subtree
Filter subtree
=new TreeFilter (root);
Filter noSubtree
=new NotFilter (subtree);
// combine the new formula with the original
Filter original
=nodeSet.getFilter ( )
Filter combined
=new AndFilter (original, noSubtree);
// create a node set in the document with the combined
formula NodeSet manipulated
=new NodeSet (nodeSet.getRoot ( ) combined);
//
// Creating a node set by deferencing a signature URI
//
// create an XML signature URI reference
String uri
="#xpointer(/Contract/Element)";   XMLDSIGReference
reference
=new XMLDSIGReference (null, uri, null, null);
// . . .
XMLContext context= . . . ;
// resolve the node set identified by the ference
Resource resource
=reference.resolveResource (context);
NodeSet nodeSet
=resource.getNodeSet ( )
//
// Manipulating a node set by applying a transform
//
// create an enveloped signature transform XMLD-
SIGTransform transform
=new XMLDSIGEnvelopedSignatureTransform ( )
// . . .
NodeSet nodeSet= . . . ;
XMLContext context= . . . ;
// apply the transform to a node set and get the result
Resource resource
=transform.transform (new NodeSetResource (nodeSet),
context); NodeSet transformed
=resource.getNodeSet ( )
//
// Iterating, in document order, through a node set
```

```
//NodeSet
nodeSet= . . . ;
// create an iterator over the node set
NodeSetIterator iterator
=new NodeSetIterator (nodeSet);
// iterate through the node set in document order
while (iterator.hasNext ( )
Node next
=iterator.next ( )
// process the node
//
// Applying a canonicalization algorithm to a node set
NodeSet
nodeSet= . . . ;
// create a canonicalization method XMLDSIGCanonicalizationMethod canonicalization
=new XMLDSIGXMLCanonicalization ( )
// . . .
OutputStream output= . . . ;
// canonicalize the node set in document order canonicalization.canonicalize (new NodeSetResource (nodeSet), output);
//
// Employing the method in an XML digital signature
//
create the signature URI reference with enveloped signature transform
String uri
="#xpointer(/Contract/Element)"; XMLDSIGTransform transform
=new XMLDSIGEnvelopedSignatureTransform ( )
XMLDSIGTransforms transforms
=new XMLDSIGTransforms (arrayList (transform));
XMLDSIGReference reference
=new XMLDSIGReference (null, uri, null, transforms);
XMLDSIGCanonicalizationMethod canonicalization
=new XMLDSIGXMLCanonicalization ( )
// encapsulate the signature reference and canonicalization method XMLDSIGSignedInfo signedInfo
=new XMLDSIGSignedInfo (null, canonicalization, null, arrayList (reference));
// create the XML signature
XMLDSIGSignature signature
=new XMLDSIGSignature (null, signedInfo, null, null, null);
Document document=
XMLContext context= . . . ;
// generate the XML signature-internally this dereferences the
// URI to produce a node set, transforms the node set with the
// enveloped signature transform and canonicalizes the resulting
// node set
signature.sign (document, null, context);
```

What is claimed is:

1. A method, comprising:
  deriving by a computing device, from an initial representation that describes a node set of an XML document, a derived representation of the node set, the initial representation including an ordered sequence of set manipulations of the XML document, the derived representation including:
    a first set of nodes such that all nodes in the node set are included in or descendants of a node in the first set of nodes,
    a second set of nodes such that no nodes in the node set are included in or descendants of a node in the second set of nodes, and
    a set of node tests that characterize the node set, to be applied to those nodes within the first set of nodes but outside the second set of nodes; and
  evaluating the derived representation to compute the node set.

2. The method of claim 1, further comprising enumerating the node set computed from the derived representation.

3. The method of claim 2, wherein the node set is enumerated in document order.

4. The method of claim 2, further comprising signing the enumerated node set.

5. The method of claim 2, further comprising:
  applying a canonicalization algorithm to the enumerated node set to create a byte stream; and
  creating at least one of a message digest and a digital signature based on the byte stream.

6. The method of claim 5, further comprising inserting the at least one of the message digest and the digital signature into the XML document.

7. The method of claim 5, wherein applying the canonicalization algorithm includes removing comments from the enumerated node set.

8. The method of claim 1, wherein:
  the first set of nodes is defined by a first set of root nodes such that all nodes from the node set are within trees rooted by one of the first set of root nodes, and
  the second set of nodes is defined by a second set of root nodes such that no nodes from the node set are within trees rooted by one of the second set of root nodes.

9. The method of claim 1, further comprising at least one of sorting the first set of nodes to be in document order, and sorting the second set of nodes to be in document order.

10. The method of claim 1, further comprising applying at least one axiom of algebra to the initial representation to derive the derived representation, without enumerating the initial representation.

11. The method of claim 10, wherein applying the at least one axiom of algebra to the initial representation to derive the derived representation includes reordering terms of the initial representation.

12. A non-transitory computer-readable medium storing a software program, the software program being executable to provide operations comprising:
  deriving, from an initial representation that describes a node set of an XML document, a derived representation of the node set, the initial representation including an ordered sequence of set manipulations of the XML document, the derived representation including:
    a first set of nodes such that all nodes in the node set are included in or descendants of a node in the first set of nodes,
    a second set of nodes such that no nodes in the node set are included in or descendants of a node in the second set of nodes, and
    a set of node tests that characterize the node set to be applied to those nodes within the first set of nodes but outside the second set of nodes; and
  evaluating the derived representation to compute the node set.

13. The computer-readable medium of claim 12, wherein the operations further comprise enumerating the node set computed from the derived representation.

14. The computer-readable medium of claim 12, wherein the operations further comprise signing the enumerated node set.

15. The computer-readable medium of claim 12, wherein the operations further comprise
applying a canonicalization algorithm to the enumerated node set to create a byte stream;
creating at least one of a message digest and a digital signature based on the byte stream; and
inserting the at least one of a message digest and a digital signature into the XML document.

16. The computer-readable medium of claim 12, wherein the operations further comprise applying at least one axiom of algebra to the initial representation to derive the derived representation, without enumerating the initial representation.

17. A system, comprising:
a computing device configured to:
derive, from an initial representation that describes a node set of an XML document, a derived representation of the node set, the initial representation including an ordered sequence of set manipulations of the XML document, the derived representation including:
a first set of nodes such that all nodes in the node set are included in or descendants of a node in the first set of nodes,
a second set of nodes such that no nodes in the node set are included in or descendants of a node in the second set of nodes, and
a set of node tests that characterize the node set to be applied to those nodes within the first set of nodes but outside the second set of nodes; and
evaluate the derived representation to compute the node set.

18. The system of claim 17 wherein the computing device is further configured to enumerate the node set computed from the derived representation.

19. The system of claim 18 wherein the computing device is further configured to sign the enumerated node set.

20. The system of claim 18 wherein the computing device is further configured to:
apply a canonicalization algorithm to the enumerated node set to create a byte stream;
create a digital signature based on the byte stream; and
insert the digital signature into the XML document.

21. The system of claim 19, wherein the computing device is further configured to:
receive an indication from a user that the node set is to be signed; and
create the digital signature according to a key associated with the user.

22. The system of claim 17, wherein the computing device is further configured to apply at least one axiom of algebra to the initial representation to derive the derived representation, without enumerating the initial representation.

* * * * *